United States Patent [19]

Samejima et al.

[11] Patent Number: 4,977,733
[45] Date of Patent: Dec. 18, 1990

[54] FOUR WHEEL STEERING TRACTOR HAVING A MID-MOUNT MOWER

[75] Inventors: Kazuo Samejima; Tetsuaki Hayashi; Niro Bando; Kenji Matsuda; Tsuyoshi Sato; Teruo Shimamura; Toshihiko Hamada; Hironori Tsuchihashi; Yoshikazu Togoshi; Masatami Fukuda, all of Sakai, Japan

[73] Assignee: Kubota, Ltd., Osaka, Japan

[21] Appl. No.: 309,519

[22] Filed: Feb. 10, 1989

[30] Foreign Application Priority Data

| Feb. 17, 1988 | [JP] | Japan | 63-35596 |
| Jul. 15, 1988 | [JP] | Japan | 63-94187[U] |
| Oct. 22, 1988 | [JP] | Japan | 63-266835 |
| Nov. 28, 1988 | [JP] | Japan | 63-154631[U] |

[51] Int. Cl.$^5$ .......................... A01D 34/66; B62D 7/00
[52] U.S. Cl. ............................... 56/14.7; 56/DIG. 22; 180/234; 180/236; 280/91; 280/99
[58] Field of Search .............. 56/6, 14.7, 14.8, 17.1, 56/17.2, 16.7, 10.1, DIG. 22; 180/234, 236, 900; 280/91, 99–103

[56] References Cited

U.S. PATENT DOCUMENTS

| 3,063,226 | 11/1962 | Pfauser | 56/17.1 X |
| 3,118,266 | 1/1964 | Colburn | 56/6 X |
| 3,198,541 | 8/1965 | Christenson et al. | 280/99 X |
| 3,874,150 | 4/1975 | Boeck | 56/17.1 |
| 4,671,376 | 6/1987 | Ito et al. | 180/249 |

FOREIGN PATENT DOCUMENTS

| 811546 | 7/1949 | Fed. Rep. of Germany | 280/91 |
| 61-44072 | 3/1986 | Japan . | |
| 61-37218 | 10/1986 | Japan . | |
| 232079 | 9/1988 | Japan | 280/91 |
| 1222610 | 2/1969 | United Kingdom | 280/91 |

Primary Examiner—Ramon S. Britts
Assistant Examiner—David J. Bagnell
Attorney, Agent, or Firm—Jordan and Hamburg

[57] ABSTRACT

A four wheel steering tractor comprising a grass cutting system vertically movably mounted in a lower space of the tractor between front and rear wheels. The grass cutting system carries gauge wheels disposed at opposite lateral sides in rear regions thereof. An interlocking structure between a steering wheel and the front and rear wheels includes a front drag link extending from a pitman arm toward the left (or right) front wheel, and a rear drag link extending from the pitman arm toward the right (or left) rear wheel. This interlocking structure places the center of tractor turning approximately on a straight line extending through the gauge wheels and adjacent one of the gauge wheels.

15 Claims, 12 Drawing Sheets

FOUR WHEEL STEERING TRACTOR HAVING A MID-MOUNT MOWER

BACKGROUND OF THE INVENTION

The present invention relates to four wheel steering tractors, and particularly to a four wheel steering tractor having a mower or grass cutting system mounted in a lower spece thereof between front and rear wheels.

A tractor having this type of construction is disclosed in U.S. Pat. No. 4,671,376, for example. As apparent from this patent, gauge wheels are provided forwardly and rearwardly of a blade housing forming part of the grass cutting system. The front gauge wheel, generally, does not constnatly engage the ground but performs an ancillary function during a grass cutting operation. In this U.S. patent, however, the front gauge wheel has a somewhat different construction since the blade housing includes a sensor for enabling automatic running of the tractor. The rear guage wheels usually comprise caster type wheels which constantly engage the ground during a grass cutting operation and follow turning round of the tractor in a natural way. However, the caster type guage wheels turn 180 degrees each time the tractor is reversed from forward running to backward runnig or vice vice, thereby marring the lawn or digging the ground. There occurs a further inconvenience of the gauge wheels spinning on their swivels when the blade housing is raised from the ground. The gauge wheels turning to an unnecessary extend could interfere with the tires when the tractor makes a sharp small turn.

In order to eliminate these disadvantages, the gauge wheels may be fixed against oscillation relative to the blade housing. However, when the tractor makes a small turn, a very small radius of turning being possible particularly in a four wheel sterring mode, such gauge wheels will have difficulties in following the movement of the tractor. The gauge wheels will tend to make side slips thereby to mar the lawn all the same.

In addition to the above problem, a four wheel steering tractor having a mid-mount grass cutting system has the following problem which is related to a steering link mechanism for enabling the four wheel steering mode. As disclosed in Japanese Patent Publication Kokai No. 64-44072, a construction for steering the front and rear wheels in opposite directions includes a bell crank disposed adjacent a rear axle case and connected at opposite ends thereof to knuckle arms of the right and left rear wheels through right and left rear drag links, respectively. One end of the bell crank is connected to a pitman arm through a front drag link. This construction is complicated since it requires a bell crank for relaying purposes, and two drag links connected to the right and left knuckle arms, respectively. Where a grass cutting system is mounted in a lower space of the tractor between the front and rear wheels, it is desirable to keep a drive input section at the center of a blade housing out of contact with the tractor body when the blade housing is raised. However, the presence of the pitman arm and associated components centrally of the bottom of the tractor body allows only a small range for vertical movement of the blade housing. With the limited range of vertical movement, the grass cutting system could collide with earth surfaces when the tractor runs over uneven ground.

SUMMARY OF THE INVENTION

The object of the present invention is to provide a four wheel steering tractor having a mid-mount mower or grass cutting system, which eliminates the various disadvantages encountered in adapting tractors with a mid-mount grass cutting system for four wheels steering and which is capable of excellent grass cutting performance.

In order to achieve this object, a four wheel steering tractor according to the present invention comprises front and rear wheels steerable by a steering wheel, a grass cutting system mounted in a lower space of the tractor between the front and rear wheels, gauge wheels disposed at opposite lateral sides and in rear regions of the grass cutting system with respect to a longitudinal direction of the tractor, and connecting means for operatively connecting the steering wheel to the front and rear wheels to transmit movement of the steering wheel to the front and rear wheels for realizing a four wheel steering mode, wherein a center of tractor turning in the four wheel steering mode is located approximately on a straight line extending through the gauge wheels.

In the above construction, the gauge wheels, even where they are not the caster type, namely fixed or slightly oscillatable, are always directed substantially tangentially of turning circles of the guage wheels. Thus, the gauge wheels are checked against side slips.

Further, the center of tractor turning with a minimum radius in the four wheel steering mode may advantageously be located adjacent one of the guage wheels. When the tractor makes a sharp turn with a minimum turning radius, one of the right and left gauge wheels is very close to the center of tractor turning and moves only slightly, thereby leaving the lawn unmarred.

In order to allow the grass cutting system to be raised to a high level to avoid the inconvenience of the grass cutting system colliding with earth surfaces when the tractor runs over uneven ground, the connecting means in a preferred embodiment of the invention includes a pitman arm projecting laterally of the tractor body and oscillatable in response to turning of the steering wheel, a front wheel connecting arm provided for one of the front wheels, a rear wheel connecting arm provided for one of the rear wheels on the same lateral side as the other front wheel, a front wheel drag link extending substantially longitudinally of the tractor body for connecting the pitman arm to the front wheel connecting arm, a rear wheel drag link extending across the tractor body for connecting the pitman arm to the rear wheel connecting arm, the rear wheel drag link being bent to define an upper end connected to the pitman arm and a lower end connected to the rear wheel connecting arm, a front wheel tie rod interconnecting the frotn wheels, and a rear wheel tie rod interconnecting the rear wheels.

This connecting means realizes a simplified construction in that the rear drag link directly interconnects the pitman arm and the rear wheel connecting arm, thereby omitting a relay member from the interlocking system. In addition, the pitman arm projects laterally of the tractor body, and the rear drag link has a forward end disposed at a high level. This construction eliminates the possibility of contact between the tractor body and a drive input section of the grass cutting system which, for example, is provided to project from the top surface of the blade housing. The rear drag link extends rearwardly below the tractor body, and therefore no extensive modification of the tractor body is required for disposing the rear drag link diagonally thereof.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Embodiments of the present invention will be described hereinafter with reference to the drawings.

Figure 1:
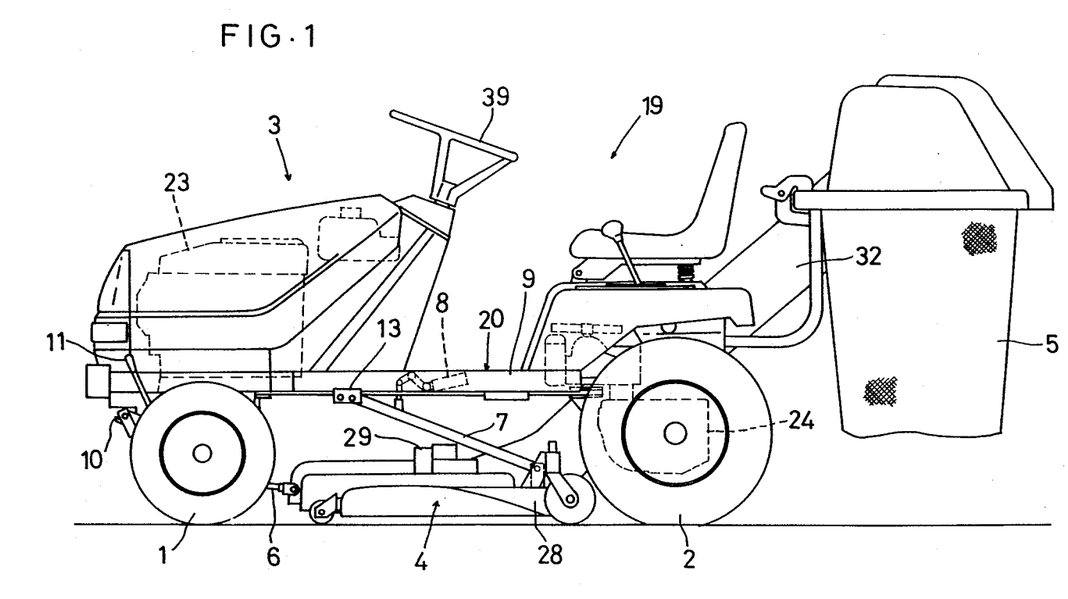
FIG. 1 is a side elevation of a garden tractor.

FIG. 1 shows a riding type lawn mower or garden tractor constructed in accordance with the present invention. This tractor comprises front wheels 1 and rear wheels 2 supporting a tractor body 3. The tractor body 3 carries a grass cutting system 4 vertically movably supported thereunder, and a grass catcher 5 at a rear end thereof for collecting grass clippings.

Figure 2:
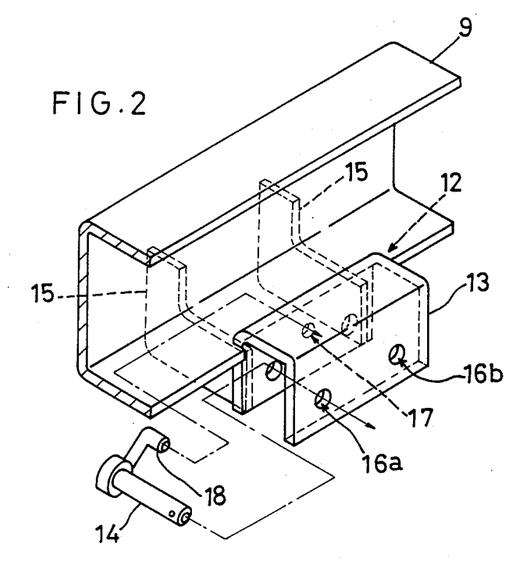
FIG. 2 is a perspective view of a rear link connection.
Figure 3:
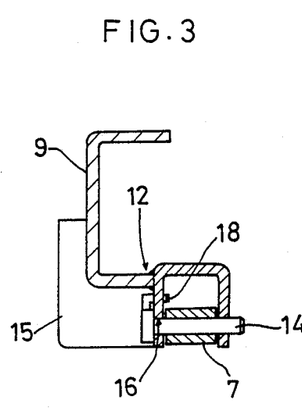
FIG. 3 is a sectional view of the rear link connection.

The grass cutting system 4 is supported for vertical movement through a parallelogram link mechanism including right and left front links 6 and right and left rear links 7. The link mechanism is movable by a hydraulic cylinder 8 to raise and lower the grass cutting system 8 while maintaining the latter in a selected posture. The front links 6 have forward ends thereof lockable with and unlockable from oscillatable hooks 10 provided at front positions of channel-shaped, right and left chassis frame members 9. The oscillatable hooks 10 are switchable by a hand lever 11 between a position to lock the front link 6 and a position to release the front links 6. Each of the rear links 7 is connected to the corresponding chassis frame member 7 as shown in FIGS. 2 and 3. The illustrated connecting structure includes a cutout 12 defined in a lower extension of the channel-shaped chassis frame member 9, and a channel-shaped connecting bracket 13 secured in the cutout 12 so as to open downwardly. The rear link 7 has an upper end thereof inserted into the connecting bracket 13 and pivotally connected thereto by a connecting pin 14 extending through the upper end of the link 7 and the connecting bracket 13. Two reinforcing plates 15 are secured to and extend between lower positions on an inward lateral wall of the connecting bracket 13 and positions on an inside wall of the chassis frame member 9. The connecting bracket 13 defines two pairs of pin-receiving bores 16a and 16b spaced from each other in the fore and aft direction of the tractor, to allow variations in the attaching position of the grass cutting system 4 relative to the tractor body 3. The variations in the attaching position of the grass cutting system 4 will be described in greater detail later. The connecting bracket 13 further defines an engaging bore 17 in the inward lateral wall thereof for receiving an engaging projection 18 which is integral with and projects from the connecting pin 14, thereby to prevent rotation of the connecting pin 14 and sliding friction between the connecting pin 14 and connecting bracket 13.

Figure 4:
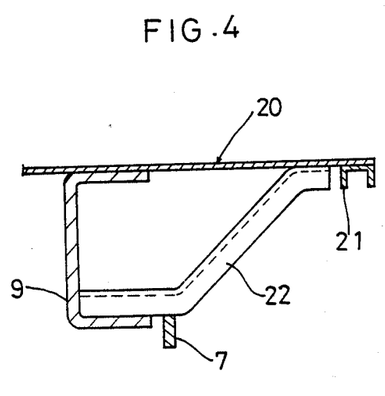
FIG. 4 is a sectional view of a driver's deck support.

The tractor comprises a driver's section 19 in an upper mid-position of the tractor body 3. The driver's section 19 includes a deck 20 mounted on the chassis frame members 9, with each lateral edge supported by an auxiliary frame member 21, as shown in FIG. 4. A reinforcing member 22 extends from each chassis frame member 9 to a transversely intermediate position of the deck 20. This reinforcing member 22 acts as a stopper which is contactable by each rear link 7 when the grass cutting system 4 is raised, thereby setting an upper limit to the vertical movement of the grass cutting system 4.

Figure 5:
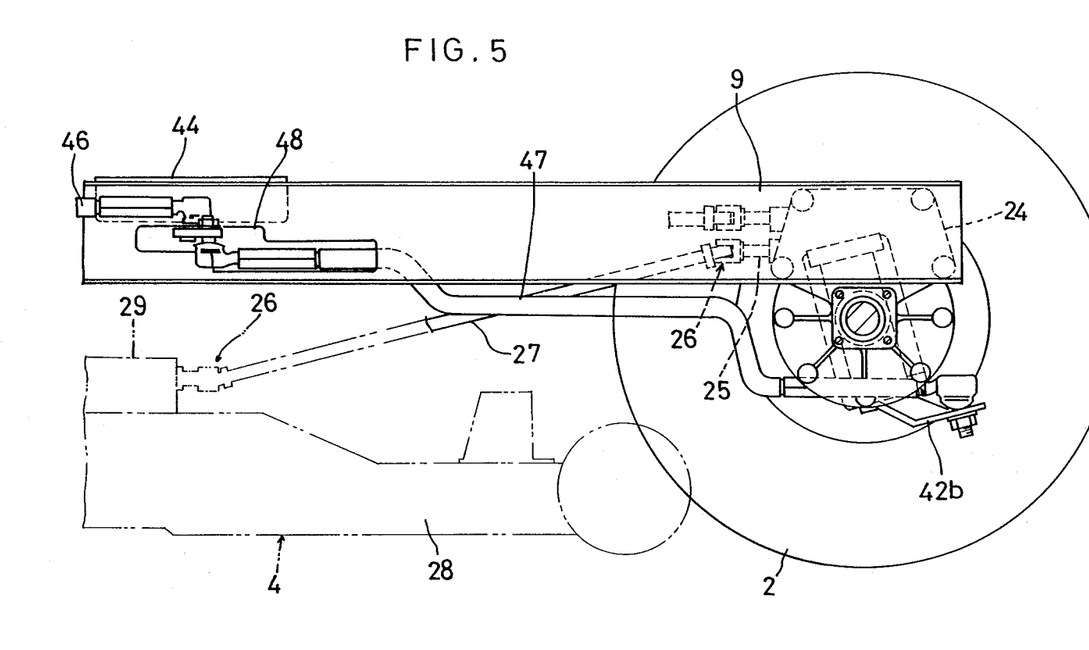
FIG. 5 is a side view of a steering system.
Figure 6:
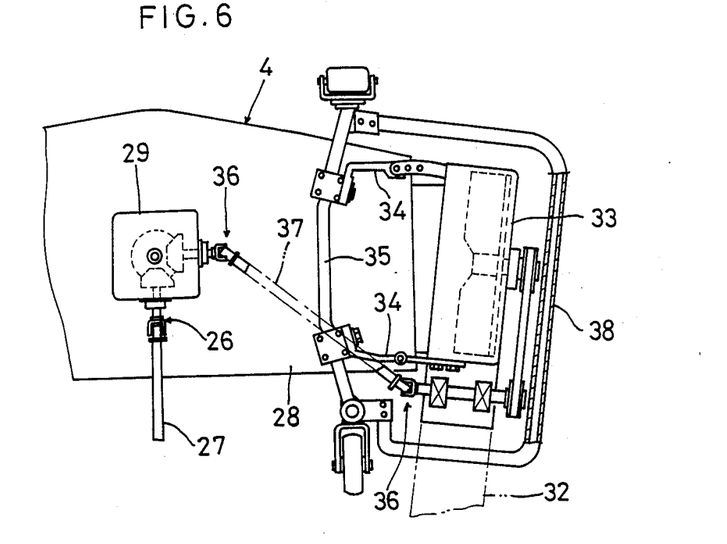
FIG. 6 is a plan view of a drive system.
Figure 7:
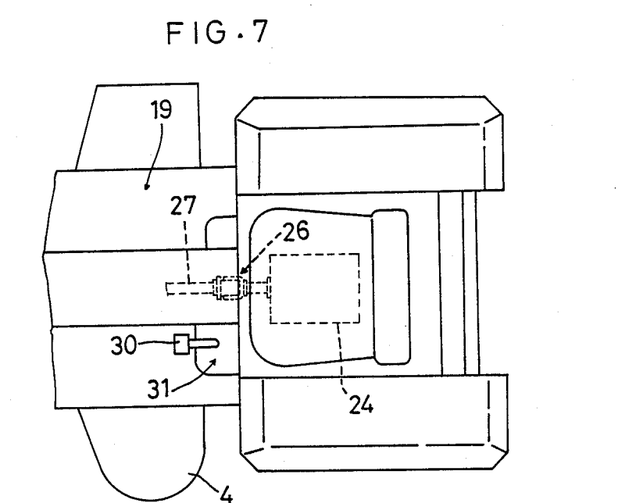
FIG. 7 is a plan view of a driver's system.

Referring to FIGS. 5 and 6, the grass cutting system 4 is driven by an engine 23 mounted on a front position of the tractor body 3 (FIG. 1), through a transmission case 24 disposed in a rear position of the tractor body 3, a power takeoff shaft 25 extending forwardly from the transmission case 24, a universal join 26 and a transmisson shaft 27. The drive is inputted to a bevel gear case 29 acting on a drive input section projecting from a transversely mid-position on a top surface of a blade housing 28 of the grass cutting system 4. Thus, the drive input setion of the grass cutting system 4 is disposed at a mid-position transversely of the tractor body 3 and under the driver's deck 20. Because of this location of the drive input section, it may be difficult to connect and disconnect the transmission shaft 27 for attachment and detachment of the grass cutting system 4. However, as shown in FIG. 7, this inconvenience is eliminated by providing a large opening 31 in a transversely mid-position of the deck 20 through which a differential locking pedal 30 is mounted, to allow visual observation from above the deck 20 of connection and disconnection of the transmission shaft 27.

A blower case 33 is removably attached to one lateral side of the grass cutting system 4 for blowing and guiding grass clippings rearwardly through a duct 32 to the grass catcher 5. The blower case 33 is supported by connecting brackets 34 secured to a wheel supporting stay 35 connected to the blade housing 28. The blower case 33 is formed of a plastic material throughout and accommodates a fan. This fan is driven by power transmitted from the bevel gear case 29 through a universal joint 36 and a transmission shaft 37. The blower case 33 is surrounded by a protective frame 38 for protection from damage due to contact with external objects. The protective frame 38 is secured at opposite ends thereof to the wheel supporting stay 35.

The blade housing 28 carries a limit gauge wheel 100 disposed at a front, transversely mid-position thereof, and two gauge wheels 101 disposed vertically adjustably at rear, transversely opposite positions thereof. The gauge wheels 101 are the fixed type instead of being the caster type, and are disposed laterally outwardly of the rear wheels 2, respectively.

The limit gauge wheel 100 rarely contacts the ground during a grass cutting operation, and acts as a limiter when, for example, the blade housing 28 dips inadvertently.

The relationship between the positions of the gauge wheels 101 and a center of tractor turning forms an important aspect of the present invention, which will be described in detail later.

Figure 8:
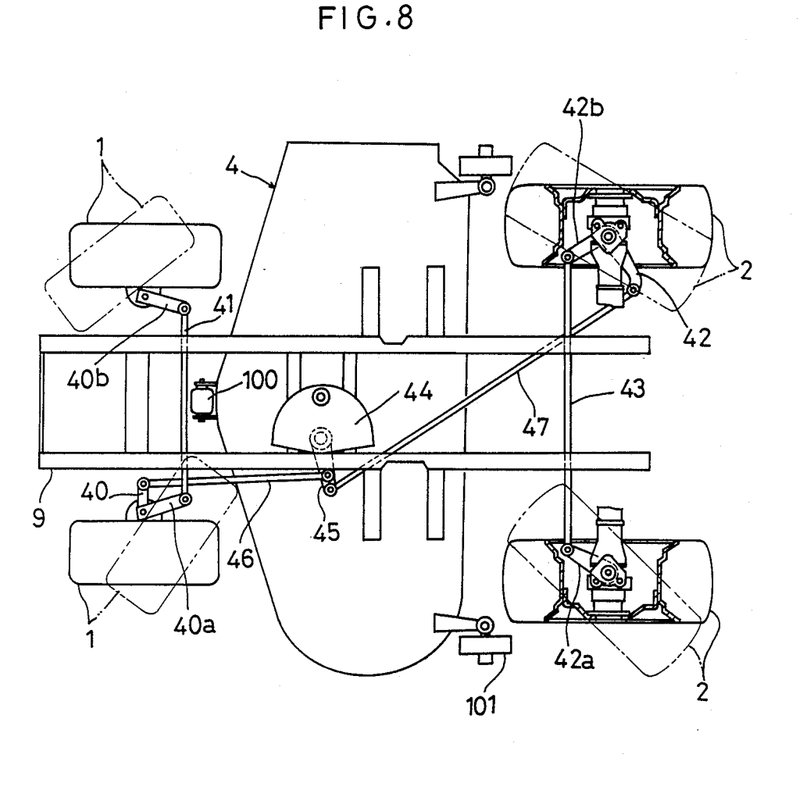
FIG. 8 is a plan view of the steering system.
Figure 9:
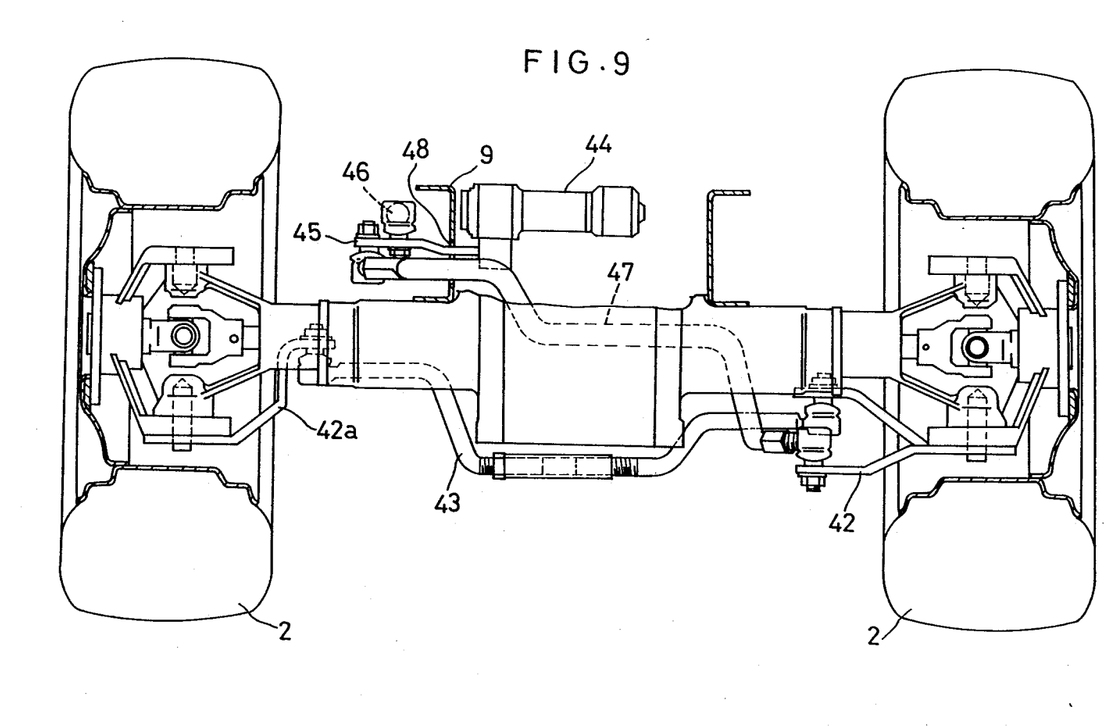
FIG. 9 is a rear view of the sterring system.

The illustrated garden tractor comprises a steering system enabling a four wheel steering mode in which the front and rear wheels are steerable in an opposite angular relationship with each other by turning a steering wheel 39 included in the driver's section 19. Specifically, as shown in FIGS. 8 and 9, the right and left front wheels 1 have respective knuckle arms 40a and 40b interconnected by a front tie rod 41, and similarly the right and left rear wheels 2 have respective knuckle arms 42a and 42b interconnected by a rear tie rod 43. The steering system includes a steering gear box 44 pivotally supporting a pitman arm 45. The left front wheel 1 has a connecting arm 40 connected to the pitman arm 45 through a front drag link 46, while the right rear wheel 2 has a connecting arm 42 connected to the pitman arm 45 through a rear drag link 47. The knuckle arms 40a and 42b are operatively connected to the connecting arms 40 and 42, respectively.

As also seen from FIGS. 5 and 9, the pitman arm 45 projects laterally outwardly through an opening 48 defined in the left chassis frame member 9, to be operatively connected to the connecting arm 40 of the left front wheel 1 through the front edge drag link 46 extending along a lateral outside wall of the left chassis frame member 9. The rear drag link 47 operatively interconnecting the pitman arm 45 and the connecting arm 42 of the right rear wheel 2 extends through the opening 48, and is bent downwardly from a position opposed to the bevel gear case 29 of the grass cutting system 4, to extend under and across a rear position of the right chassis frame member 9.

This steering system constitutes a simple construction for enabling a four wheel steering mode in which the front and rear wheels 1 and 2 are steered in opposite directions to allow the tractor to make a small, sharp turn. This construction also allows the grass cutting system 4 to be raised and lowered over an increased range.

It is of course possible to construct the system such that the pitman arm 45 projects rightward from the right chassis frame member 9, with the front drag link 46 operatively connected to a connecting arm provided for the right front wheel 1, and the rear drag link 47 operatively connected to a connecting arm provided for the left rear wheel 2.

The relationship between the positions of the gauge wheels 101 and the center of tractor turning will be described next with reference to FIG. 10.

Figure 10:
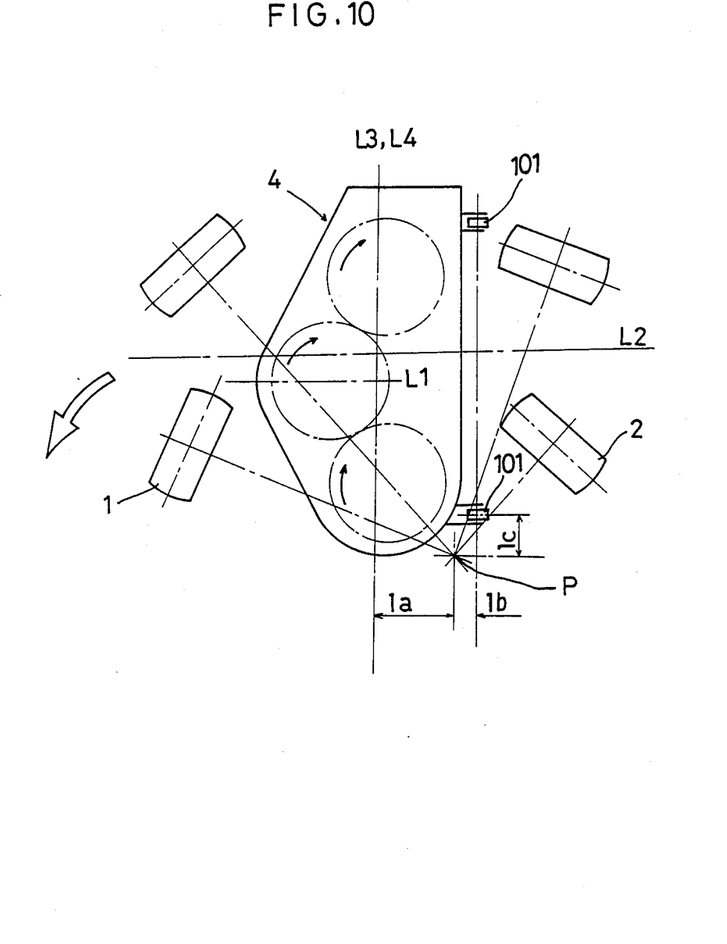
FIG. 10 is an explanatory view of a relationship between a center of tractor turning and guage wheel positions.

In this embodiment, as shown in FIG. 10, a center-line L1 extending in the fore and aft direction of the grass cutting system 4 is slightly offset from a center-line L2 in the fore and aft direction of the tractor body 3, whereas a center-line L3 extending transversely of the grass cutting system 4 substantially coincides with a center-line L4 extending transversely of the tractor body 3 and equidistantly from the front and rear wheels 1 and 2.

The described steering structure of the tractor places the center of tractor turning P adjacent one of the rear gauge wheels 101 when the tractor turns around with a minimum radius. Specifically, when the tractor makes a minimum radius turn, the center of turning P is located rearwardly of the transverse center-line L4 by a distance 1a, away in the fore and aft direction by a distance 1b from a line extending through the gauge wheels 101, and away laterally by a distance 1c from one of the gauge wheels 101. It is desirable to minimize the distances 1b and 1c.

As seen from FIG. 10, both gauge wheels 101 are disposed substantially at right angle to the line extending therethrough. Since the gauge wheels 100 and 101 are not oscillatable relative to the blade housing 28, these wheels 100 and 101 do not turn 180 degrees to mar the lawn, as do the caster type gauge wheels, when the tractor is reversed from forward running to backward running or vice versa.

When the tractor makes a minimum radius turn in the four wheel steering mode, the gauge wheel 101 adjacent the center of turning P makes only minor side slips and does not mar the lawn. The gauge wheel 101 remote from the center of turning P at this time has a relatively large radius of turnings, and there arises no question of marring the lawn by its side slips.

Figure 11:
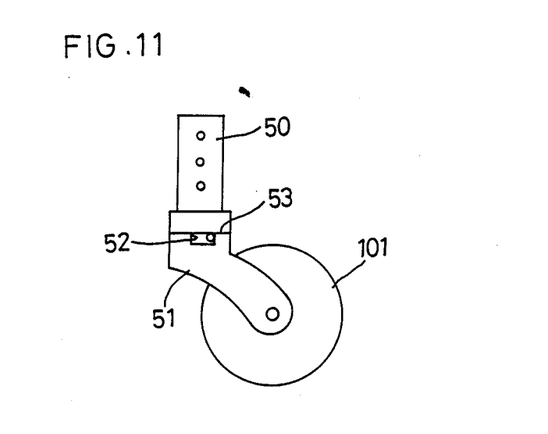
FIG. 11 is a side view of a gauge wheel.
Figure 12:
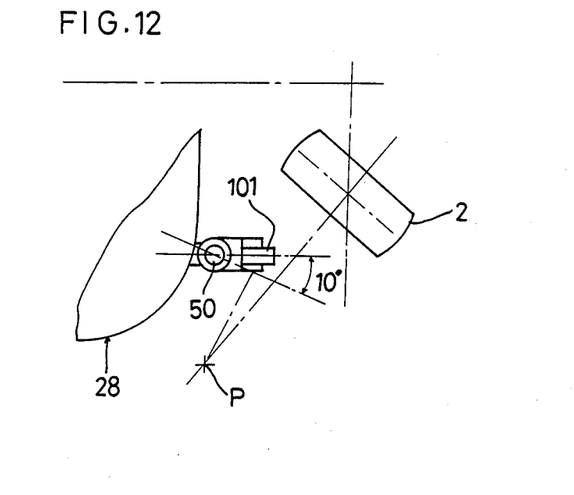
FIG. 12 is a plan view of the guage wheel.

FIGS. 11 and 12 show one of the gauge wheels 101 which are allowed to oscillate through an angle of about 10 degrees as a modified embodiment.

The illustrated gauge wheel 101 has a support 51 rotatably attached to a swivel 50 fixed to the blade housing 28. The support 51 defines a slot 52 for receiving a pin 53 projecting from the swivel 50, whereby the support 51 is osicllatable within a range defined by the slot 52. This range of oscillation is set to about 10 degrees in a tractor turning direction from straight running.

The guage wheel 101 oscillatable by about 10 degrees is readily capable of following a locus of turning when there is a slight deviation of the wheel 101 from the center of turning P.

The range of oscillation of the gauge wheel 101 is set to about 10 degrees because a range of oscillation exceeding 10 degrees would result in an excessive angle of the wheel 101 thereby marring the lawn when the tractor is reversed from forward running to backward running or vice versa. Oscillations of the wheel 101 within 10 degrees assures good following without marring the lawn when the tractor is turned around.

Next, the attachment structure, especially the link system, for raising and lowering the grass cutting system 4 relative to the tractor body 3 will be described in detail with reference to FIGS. 13A, 13B, 14 and 15.

Figure 13A:
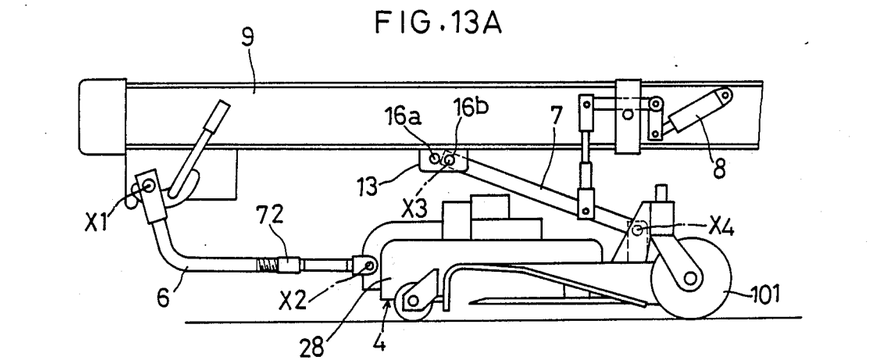
FIG. 13A is a side view of a link mechanism for raising and lowering a grass cutting system in a standard position.
Figure 13B:
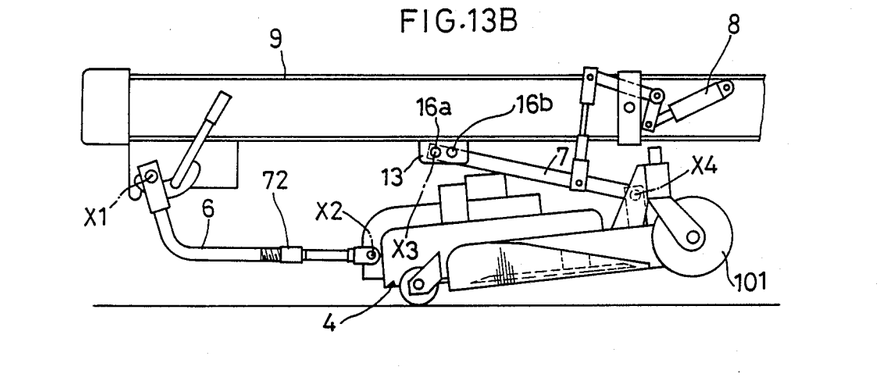
FIG. 13B is a side view of the link mechanism with grass cutting system supporting points adjusted rearwardly.

The link system includes, in addition to the pair of right and left parallel front links 6 and the pair of right and left parallel rear links 7 briefly described hereinbefore, a raising and lowering mechanism 8 from which the rear links 7 are suspended. The front links 6 extend from the forward end of the grass cutting system 4 to the front of the tractor body 3. The rear links 7 extend from the rear end of the grass cutting system 4 to the brackets 13 secured to intermediate positions of the tractor body 3. As shown in FIGS. 13A and 13B. a line extending through opposite pivotal points X1 and X2 of each front link 6 and a line extending through opposite pivotal points X3 and X4 of each rear link 7 are substantially parallel to each other. Thus the front and rear links 6 and 7 constitute a parallelogram link mechanism which allows the grass cutting system 4 to be maintained in a fixed posture, such as a horizontal posture, even when the latter is raised or lowered.

Figures 14, 15:
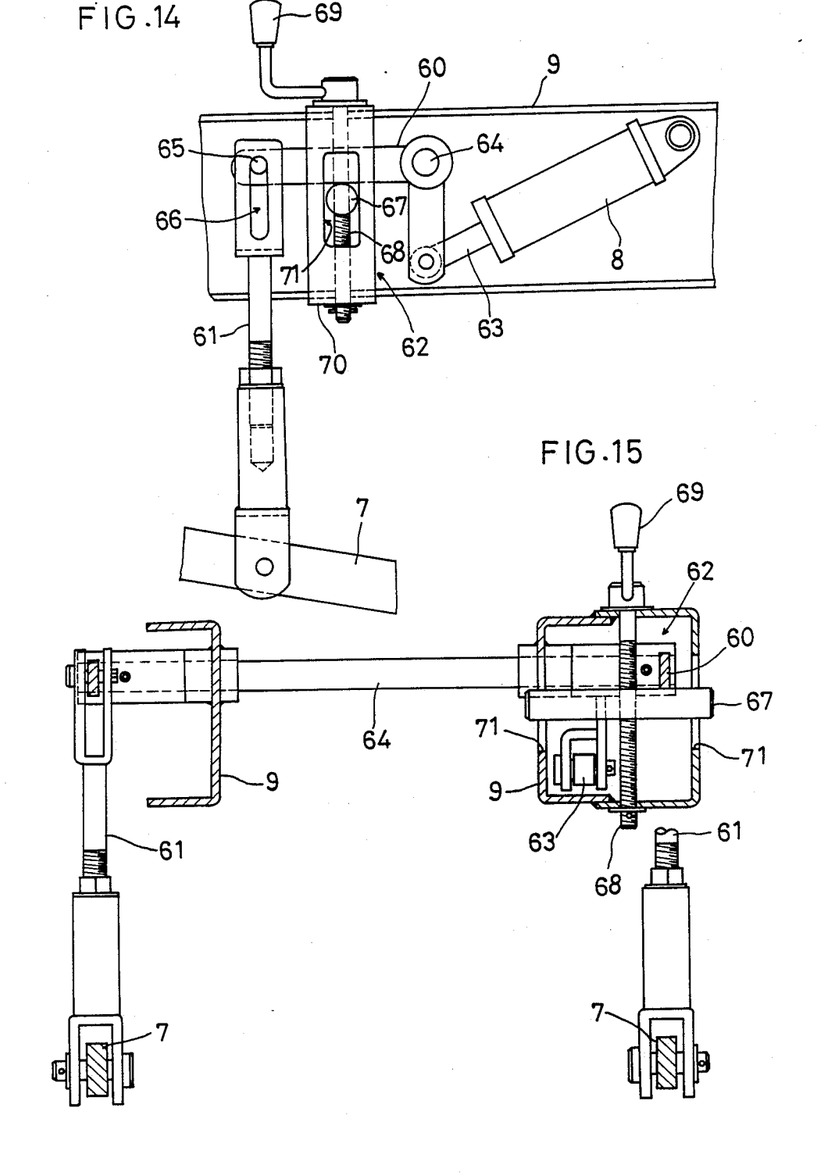
FIG. 14 is a side view of a lower limit adjusting mechanism associated with the link mechanism.
FIG. 15 is a view in vertical section of the lower limit adjusting mechanism.

As shown in FIGS. 14 and 15, the raising and lowering mechanism 8 for vertically moving the grass cutting system 4 includes a single-acting hydraulic cylinder 8, a lift arm 60 which is L-shaped in side view, a lift rod 61 and a lower limit adjusting mechanism 62. The hydraulic cylinder 8 is supported by one of the chassis frame members 9, and has a piston rod 63 pivoted to one end of the lift arm 60. The lift arm 60 is supported by a shaft 64 secured to the chassis frame members 9, to be pivotable clockwise in FIG. 14 by an extension of the hydraulic cylinder 8. The lift arm 60 carries a pin 65 at the other end thereof, which pin 65 is inserted into a slot 66 defined in an upper end of the lift rod 61. When the lift arm 60 pivots clockwise in FIG. 14, the lift rod 61 is pulled upward to raise the rear links 7 and the grass cutting system 4 together. The hydraulic cylinder 8 is capable of extension only, and the grass cutting system 4 is lowered by gravity.

The lower limit adjusting mechanism 62 sets a lower limit to the movement of the grass cutting system 4, and includes a stoppper 67, a screw 68 and an adjusting handle 69. The stopper 67 extends through guide grooves 71 defined in one of the chassis frame members 9 and a channel-shaped support member 70 attached laterally outwardly of the chassis frame member 9, respectively. The screw 68 is inserted from the top of the chassis frame member 9, and has a lower portion thereof meshed with the stopper 67. The screw 68 is rotated by turning the adjusting handle 69 connected to the top of the screw 68, which causes the stopper 67 to slide vertically along the guide groove 71 thereby to vary a position of contact between the stopper 67 and the lift arm 60.

The gauge wheels 101 are vertically adjustably attached to the rear end of the blade housing 28. Thus, a distance between the cutting blade and the ground, namely a grass cutting height, may be adjusted by vertically adjusting the gauge wheels 101.

Each of the rear links 7 includes a connecting pin 14 for insertion into either pair of pin-receiving bores 16a and 16b defined in the bracket 13 as described hereinbefore. This pin 14 defines the pivotal point X3 at which the rear link 17 is connected to the tractor body 3. When the pins 14 of the rear links 7 are inserted into the rear pin-bores 16b as shown in FIG. 13A, a grass cutting operation is carried out in what is known as the side discharge mode wherein the grass cutting system 4 is vertically movable in a substantially horizontal posture and grass clippings are discharged through a discharge opening defined laterally of the blade housing 28. When the pins 14 are inserted into the front pin-bores 16a as shown in FIG. 13B, the grass cutting system 4 is vertically movable in a forwardly inclined posture. With the grass cutting system 4 maintained in this posture, a grass cutting operation may be carried out in what is known as the rear discharge mode for discharging grass clippings rearwardly. During this operation, the lateral discharge opening of the blade housing 28 should desirably be closed with a cover or the like.

Each of the front links 6 includes a turnbuckle 72 to be adjustable in length. The grass cutting system 4 becomes vertically movable in a rearwardly inclined posture by shortening the front links 6 with the connecting pins 14 of the rear links 7 inserted into the rear pin-receiving bores 16b. The grass cutting operation may be carried out a second time with the grass cutting system 4 maintained in the rearwardly inclined posture.

When the front links 6 are shortened with the connecting pins 14 inserted into the front pin-receiving bores 16a, the grass cutting system 4 becomes vertically movable in a horizontal posture at a forward position.

Figure 16:
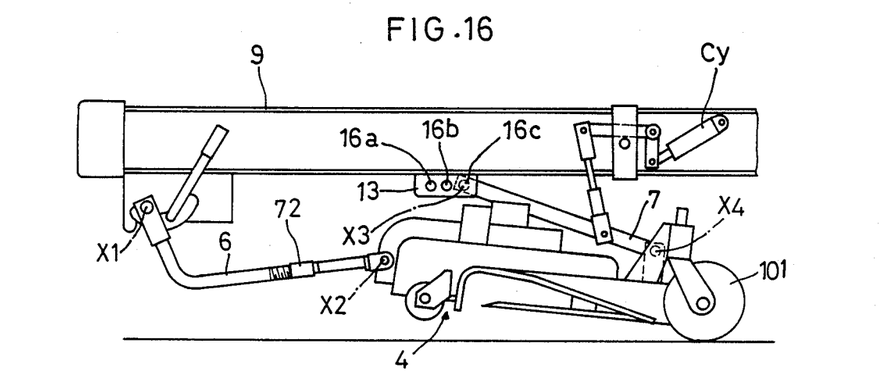
FIG. 16 is a side view of a modified link mechanism for supporting the grass cutting system.

FIG. 16 shows another possibility wherein each bracket 13 defines three pairs of pin-receiving bores 16a, 16b and 16c for varying the inclination of the grass cutting system 4 in three or more ways. It will be convenient to provide that the positional adjustment of the pivotal point X3 be effected by the driven seated in the driver's section.

Figure 17:
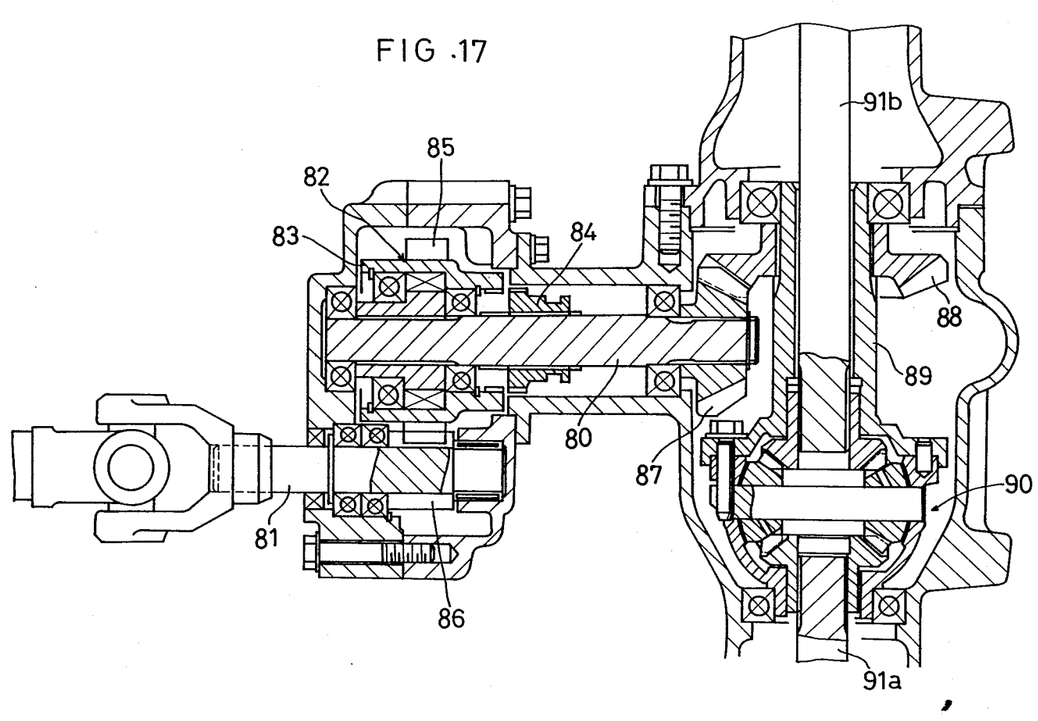
FIG. 17 is a sectional view of a part of a wheel drive structure.

FIG. 17 shows a wheel drive structure for a four wheel drive tractor. In the four wheel drive tractor, engine drive is transmitted simultaneously to the front wheels and rear wheels. When the tractor is turned in the four wheel steering mode around the center of turning located adjacent the rear wheels, the front wheels have greater turning radii and longer loci than the rear wheels. It is therefore necessary for the front wheels to revolve at greater peripheral speeds than the rear wheels.

In order to adjust the peripheral speeds of the front and rear wheels, it has been conventional practice to include a one-way clutch in the drive transmission line for the front wheels, so that drive is transmitted from the engine to the front wheels but not vice versa. According to this known construction, only the rear wheels are driven when the front wheels are turning a high peripheral speeds.

With such a one-way clutch included, however, only the rear wheels are driven for propelling the tractor backward. Furthermore, when the front wheels become caught in soft and wet ground or in a depression, the wheels must be stopped once and then driven suddenly or the tractor must be moved backward once and then forward in order to pull out of the soft ground or depression. Soft and wet ground imparts little resistance, wherefore an attempt to stop the front wheels will fail due to the presence of the one-way clutch, and the front wheels will keep turning by inertia. Lilkewise it is difficult to move the tractor out of a depression since an attempt to drive the tractor backward is likely to fail without the drive being transmitted to the front wheels.

As shown in FIG. 17, the present invention provides a one-way clutch 82 between a front wheel input shaft 80 and an engine drive shaft 81, which clutch 82 transmits engine drive to the front wheel input shaft 80 but does not transmit power from the front wheel input shaft 80 to the drive shaft 81. The front wheel input shaft 80 carries a shift gear 85 slidably mounted thereon for directly connecting the front wheel input shaft 80 to a casing 83 of the one-way clutch 82. This shift gear 85 is shiftable between a position to directly interconnect the drive shaft 81 and front wheel input shaft 80 and a position to interconnect these shafts 81 and 80 through the one-way clutch 82.

The casing 83 and drive shaft 81 are operatively interconnected through gears 85 and 86. The front wheel input shaft 21 is connected to a sleeve shaft 89 through bevel gears 87 and 88. The sleeve shaft 89 is connected to a differential 90 from which extend front axles 91a and 91b.

A further example of control structure for steering the front and rear wheels 1 and 2 will be described next with reference to FIGS. 18 and 19. This embodiment differs from the foregoing embodiment in that the ratio of the steering angle of the front and rear wheels is variable with respect to the angle of oscillation of the pitman arm resulting from a turning operation of the steering wheel.

Figures 18, 19:
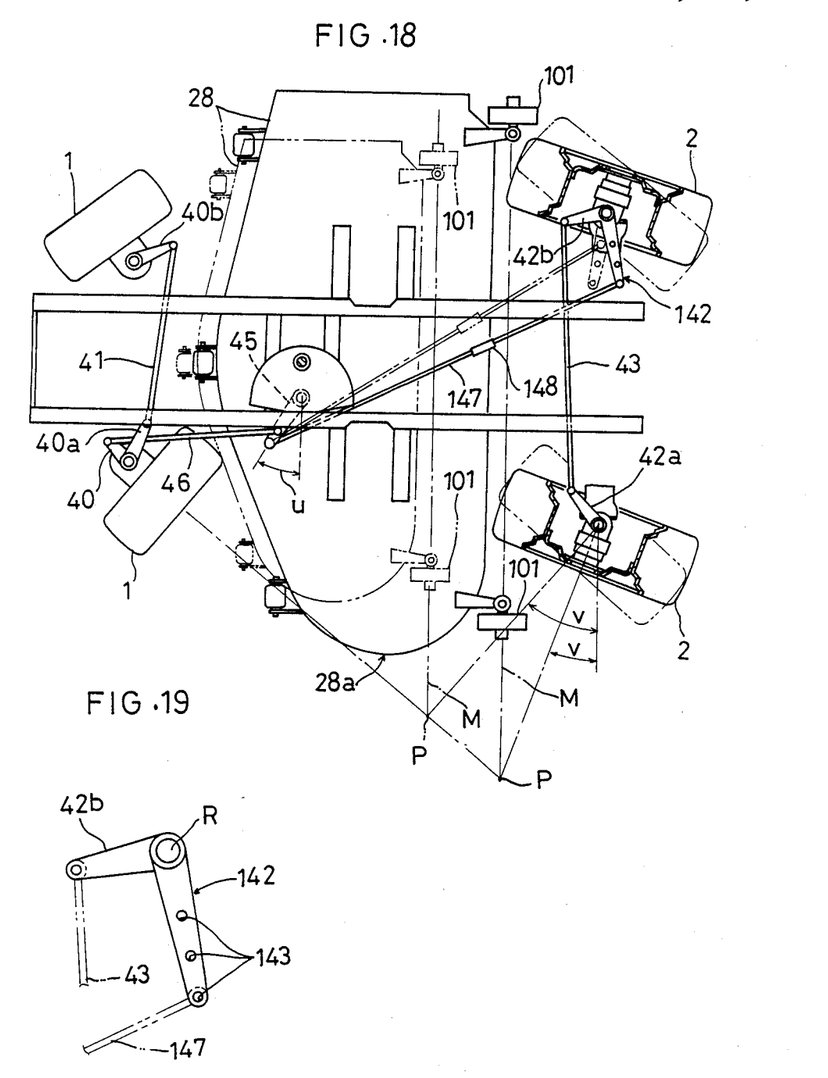
FIG. 18 is a plan view of a modified steering system.
FIG. 19 is an enlarged view of a principal portion of the modified steering system.

Referring to FIG. 18 a pitman arm 45 oscillatable with turning of the steering wheel 39 is connected to a front wheel connecting arm 40 through a front drag link 46. A front tie rod 41 interconnects a knuckle arm 4a associated with the left front wheel 1 and a knuckle arm 4b associated with the right front wheel 1. Further, the pitman arm 45 is connected to a rear wheel connecting arm 142 through a rear drag link 147. A rear tie rod 43 interconnects a knuckle arm 42b associated with the right rear wheel 2 and a knuckle arm 42a associated with the left rear wheel 2. In this construction, therefore, turning of the steering wheel 39 steers the front and rear wheels 1 and 2 in mutually opposite directions, whereby the tractor turns around a center of turning adjacent a lateral end of the blade housing 28 to minimize uncut patches of lawn.

The ratio of the steering angle v of the rear wheels 2 is variable with respect to the angle u of oscillation of the pitman arm 45. More particularly, as also shown in FIG. 19, the connecting arm 142 oscillatable with the rear wheel knuckle arm 42b defines a plurality of drag link connecting bores 143 arranged at different distances from a pivotal axis R. The rear end of the rear drag link 147 is selectively connectable to one of these connecting bores 143. The rear drag link 147 includes a turnbuckle 148 at an intermediate position thereof to adjust its length when the drag link 147 is connected to one of the bores 143.

When, for example, a grass cutting system having a large cutting width is attached, the rear drag link 147 is connected to a position, as shown in solid lines in FIG. 18, which provides a small ratio of the oscillation angle v of the rear wheels 2 with respect to the oscillation angle u of the pitman arm 45. This places the center of turning P at a minimum distance to the lateral end of the blade housing 28, and an axis m of the gauge wheels 101 close to the center of turning P thereby to minimize possibility of marring the lawn caused by side slips of the wheels 101. When a grass cutting system having a small cutting width is attached, the above ratio is increased, as shown in phantom lines in FIG. 18, thereby similarly to minimize the chances of leaving uncut lawn and of marring the lawn.

It is of course possible to arrange, as an alternative to the above construction, that the front drag link 46 is connectable to varied positions of the front wheel connecting arm 40. Further, these variations in the connecting position may be provided for both the front and rear wheels 1 and 2.

We claim:

1. A four wheel steering tractor comprising;
    a steering wheel,
    front wheels steerable by said steering wheel,
    rear wheels steerable by said steering wheel,
    a grass cutting system mounted in a lower space of the tractor between said front wheels and said rear wheels,
    a gauge wheel depending from said grass cutting system, and
    connecting means for operatively connecting said steering wheel to said front wheels and said rear wheels to transmit movement of said steering wheel to said front wheels and said rear wheels for realizing a four wheel steering mode to effect four wheel steering in which a center of tractor turning is located approximately on a projection of the axis of rotation of said gauge wheel.

2. A four wheel steering tractor as claimed in claim 1, wherein the center of tractor turning with a minimum radius in the four wheel steering mode is located adjacent said gauge wheel.

3. A four wheel steering tractor as claimed in claim 1, wherein said gauge wheel is disposed closer to said rear wheels than to said front wheels, and said connecting means is constructed to control said front wheels and said rear wheels such that said front wheels are steered through a greater angle than said rear wheels in the four wheel steering mode.

4. A four wheel steering tractor as claimed in claim 1, wherein said grass cutting system includes a blade housing verticaly movably connected to a tractor body, and a blade drive input section projecting from a center region of a top surface of said blade housing.

5. A four wheel steering tractor comprising;
    a steering wheel,
    front wheels steerable by said steering wheel,
    rear wheels steerable by said steering wheel,
    a grass cutting system mounted in a lower space of the tractor between said front wheels and said rear wheels, said grass cutting system including a blade housing vertically movably connected to a tractor body, and a blade drive input section projecting from a center region of a top surface of said blade housing, and
    connecting means for operatively connecting said steering wheel to said front wheels and said rear wheels to transmit movement of said steering wheel to said front wheels and said rear wheels for realizing a four wheel steering mode, said connecting means including
        a pitman arm projecting laterally of said tractor body and oscillatable in response to turning of said steering wheel,
        a front wheel connecting arm provided for one of said front wheels,
        a rear wheel connecting arm provided for one of said rear wheels on the same lateral side as the other front wheel,
        a front wheel drag link extending substantially longitudinally of said tractor body for connecting said pitman arm to said front wheel connecting arm,
        a rear wheel drag link extending across said tractor body for connecting said pitman arm to said rear wheel connecting arm, said rear wheel drag link being bent to define an upper end connected to said pitman arm and a lower end connected to said rear wheel connecting arm in order to avoid interference with said blade drive input section,
        a front wheel tie rod interconnecting said front wheels, and a rear wheel tie rod interconnecting said rear wheels.

6. A four wheel steering tractor as claimed in claim 5, further comprising a gauge wheel depending from said grass cutting system, wherein a center of tractor turning in the four wheel steering mode is located approximately on a projection of the axis of rotation of said gauge wheel.

7. A four wheel steering tractor as claimed in claim 6, wherein the center of minimum-radius tractor turning in the four wheel steering mode is located adjacent said gauge wheel.

8. A four wheel steering tractor as claimed in claim 6, wherein said gauge wheels is disposed closer to said rear wheels than to said front wheels, and said connecting means is constructed to control said front wheels and said rear wheels such that said front wheels are steered through a greater angle than said rear wheels in the four wheel steering mode.

9. A four wheel steering tractor comprising;
a steering wheel,
front wheels steerable by said steering wheel,
rear wheels steerable by said steering wheel,
a grass cutting system mounted in a lower space of the tractor between said front wheels and said rear wheels, said grass cutting system including a blade housing vertically movably connected to a tractor body and a blade drive input section projecting from a center region of a top surface of said blade housing,
a gauge wheel depending from said grass cutting system and being disposed closer to said rear wheels than to said front wheels, and
connecting means for operatively connecting said steering wheel to said front wheels and said rear wheels to transmit movement of said steering wheel to said front wheels and said rear wheels for realizing a four wheel steering mode, said connecting means being constructed to control said front wheels and said rear wheels such that said front wheels are steered through a greater angle than said rear wheels in the four wheel steering mode and including a pitman arm projecting laterally of said tractor body and oscillatable in response to turning of said steering wheel, a front wheel connecting arm provided for one of said front wheels, a rear wheel connnecting arm provided for one of said rear wheels on the same lateral side as the other front wheel, a front wheel drag link extending substantially longitudinally of said tractor body for connecting said pitman arm to said front wheel connecting arm, a rear wheel drag link extending across said tractor body for connecting said pitman arm to said rear wheel connecting arm, said rear wheel drag link being bent to define an upper end connected to said pitman arm and a lower end connected to said rear wheel connecting arm, a front wheel tie rod interconnecting said front wheels and a rear wheel tie rod interconnecting said rear wheels,
wherein a center of tractor turning in the four wheel steering mode is located approximately on a projection of the axis of rotation of said gauge wheel.

10. A four wheel steering tractor as claimed in claim 9, wherein said connecting means further includes a steering angle varying mechanism for varying a ratio of a steering angle of said front wheels and said rear wheels with respect to an oscillating angle of said pitman arm.

11. A four wheel steering tractor as claimed in claim 10, wherein said steering angle varying mechanism includes a plurality of connecting bores defined in said rear wheel connecting arm, and rear wheel drag link connecting means selectively engageable with said connecting bores.

12. A four wheel steering tractor as claimed in claim 10, wherein said steering angle varying mechanism includes a plurality of connecting bores defined in said front wheel connecting arm, and front wheel drag link connecting means selectively engageable with said connecting bores.

13. A four wheel steering tractor as claimed in claim 9, wherein the center of tractor turning with a minimum radius in the four wheel steering mode is located adjacent said gauge wheel.

14. A four wheel steering tractor comprising:
a steering wheel,
front wheels steerable by said steering wheel,
rear wheels steerable by said steering wheel,
a grass cutting system mounted in a lower space of the tractor between said front wheels and said rear wheels, said grass cutting system including a blade housing vertically movable connected to a tractor body, a blade drive input section projecting from a center region of a top surface of said blade housing and a link mechanism for raising and lowering said blade housing, said link meachanism including a pair of substantially parallel front links and a pair of substantially parallel rear links for connecting said blade housing to said tractor body, each said rear links having a positionally adjustable point of connection to said tractor body,
a gauge wheel depending from said grass cutting system, and
connecting means for operatively connecting said steering wheel to said front wheels and said rear wheels to transmit movement of said steering wheel to said front wheels and said rear wheels for realizing a four wheel steering mode.
wherein a center of tractor turning in the four wheel steering mode is located approximately on a projection of the axis of rotation of said gauge wheel.

15. A four wheel steering tractor as claimed in claim 14, wherein each said point of connection is variable between a first position for maintaining said blade housing parallel to the ground and a second position for maintaining said blade housing in a forwardly inclined posture relative to the ground.

* * * * *